April 7, 1970 L. A. FERRARI 3,505,540

ELECTRICAL PULSE SOURCE

Filed Feb. 7, 1966 2 Sheets-Sheet 1

INVENTOR
Leonard A. Ferrari

BY Brown & Mikulka and Richard L. Aitken
ATTORNEYS

ELECTRICAL PULSE SOURCE

Filed Feb. 7, 1966 2 Sheets-Sheet 2

INVENTOR.
Leonard A. Ferrari
BY
Brown & Mikulka and
Richard L. Aitken
ATTORNEYS

United States Patent Office 3,505,540

Patented Apr. 7, 1970

3,505,540
ELECTRICAL PULSE SOURCE

Leonard A. Ferrari, Woburn, Mass., assignor to Polaroid Corporation, Cambridge, Mass., a corporation of Delaware Filed Feb. 7, 1966, Ser. No. 525,702
Int. Cl. H03k 5/00
U.S. Cl. 307—260 26 Claims

ABSTRACT OF THE DISCLOSURE

This specification discloses a step wave generator for driving a highly capacitive load. The generator comprises a transformer the output winding of which is connected in resonant circuit with the capacitive load. Transistor switch means are provided to drive the primary winding to intermittently apply current pulses to the primary winding. While the current pulses are applied to the primary winding, the primary winding will be connected across a low impedance source which has the effect of reducing the inductance connected in the resonant circuit with the capacitive load. In between these pulses, the primary winding is open circuited which in effect makes the inductance connected in the resonant circuit with the capacitive load a high inductance during the periods between the pulses applied to the primary winding. As a result, the voltage across the capacitive load is driven rapidly between levels during the intervals of low inductance and is maintained at the levels to which it is driven during the intervals of high inductance.

This invention relates to improvements in the generation of electrical pulses, and, in one particular aspect, to novel and improved apparatus wherein electrical pulses, such as those of high voltage levels and with sharp leading and trailing edges, are uniquely and advantageously developed by uncomplicated and reliable electronic equipment in slaved relationship to synchronizing signals.

In accordance with certain proposals for designs of color television receivers, visible light emissions of different color contents may be produced by accelerating the electrons in a scanning beam in the picture tube to different velocities. In one such system involving modulations of electron kinetic energies, an accelerating electrode at the face plate of the picture tube is rapidly switched between different levels of high positive potentials so that the velocities at which the electrons impinge upon the screen of the picture tube are varied in synchronism with the charging requirements for the different color outputs. Switching times must be kept extremely short, despite wide excursions in voltages, and the supply of switched voltages must be capable of feeding the highly capacitive load represented by the accelerating anode structure. Dissipations of large amounts of power would normally be expected to occur.

In accordance with the present teachings, sustained electrical pulses of either very high or reltaively low voltage levels, and having short rise and fall times, are uniquely produced at remarkably high efficiency by way of inductive apparatus which is switched by relatively small control signals to exhibit alternately high and low inductances in tuned circuit relationship with capacitance. Advantageously, the switchings may be performed under relatively low current and voltage conditions, enabling the use of low-cost transistors for such purposes, and the output pulses are well suited for excitations of color television picture-tube accelerating anodes and/or of chrominance-gating circuitry.

Accordingly, it is one of the objects of the present invention to provide novel and improved apparatus of inexpensive construction which effectively switches between potential levels at high rates and with high efficiency.

Another object is to provide unique and advantageous circuitry of uncomplicated form for driving highly capacitive loads between predetermined potential levels rapidly and with small power losses.

A further object is to provide an improved source of sustained electrical pulses alternated rapidly between high voltage levels in synchronism with triggering impulses.

An additional object of the present invention is to provide a novel generator of stepped pulses which is associated with an excites a highly capacitive load such as an accelerating anode structure of a velocity-modulated television picture tube.

Still further it is an object to provide a low-power stepped-wave generator including a uniquely-varied inductance and a highly capacitive load which together promote the formation of high-voltage waves having good rectangular characteristics and having precise slaved relationships with synchronizing impulses.

By way of a summary account of practice of this invention in one of its aspects, high voltage pulses of substantially square or rectangular form are developed across a parallel combination of a substantially fixed capacitance and the inductances which are witnessed in a secondary winding of a transformer the primary side of which is at different times caused to exhibit open-circuit or essentially short-circuit characteristics. The short-circuit conditions, produced by forcing brief pulses of currents through the primary side via a low-impedance source, result in a low effective inductance, and, hence, a high resonant frequency LC combination on the secondary side, at the very times when voltages are being induced in the secondary by these primary currents. The open-circuit conditions, effective at other times, result in a high effective inductance, and, hence, a relatively low resonant frequency LC combination on the secondary side. By pulsing currents through the primary structure at appropriately spaced intervals to induce secondary voltages of alternately opposite polarities, the output voltage is advantageously caused to alternately rise and remain at a high level and then drop and remain at a lower level.

Although the features of this invention which are considered to be novel and expressed in the appended claims, further details as to preferred practices and embodiments, as well as to the further objects and advantages thereof, may be most readily comprehended through reference to the following description taken in connection with the accompanying drawings, wherein:

Figures 3, 4:
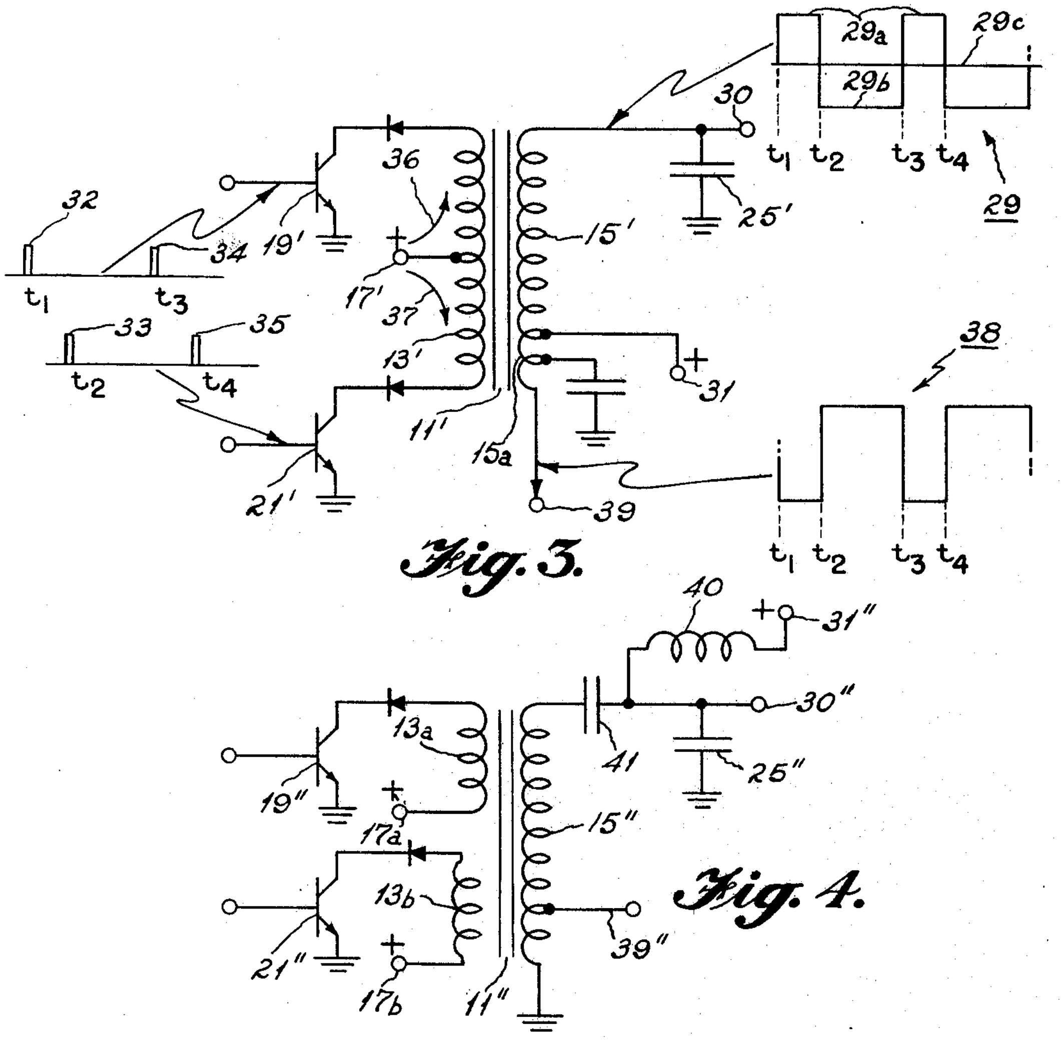
Figure 5:
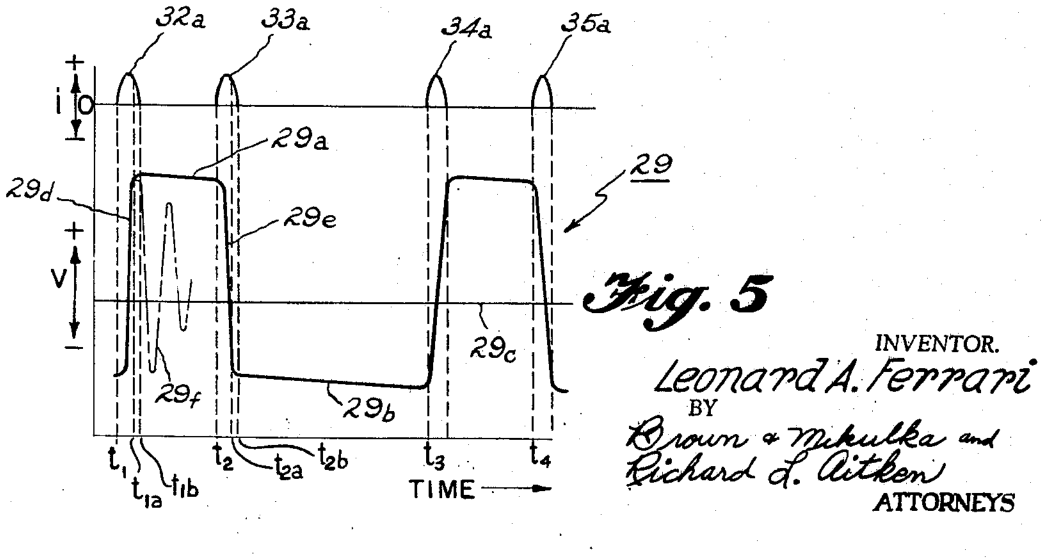

FIGURE 3 provides schematic details, together with related waveforms, for an alternative embodiment of a synchronized stepped-wave generator;

FIGURE 4 represents another stepped-wave generator having separate primary windings and provisions for isolating the inductance unit from high voltage on which the outputs are superimposed; and FIGURE 5 comprises a set of waveforms characterizing certain current and voltage conditions associated with operation of the improved stepped-wave generators.

Figure 1:
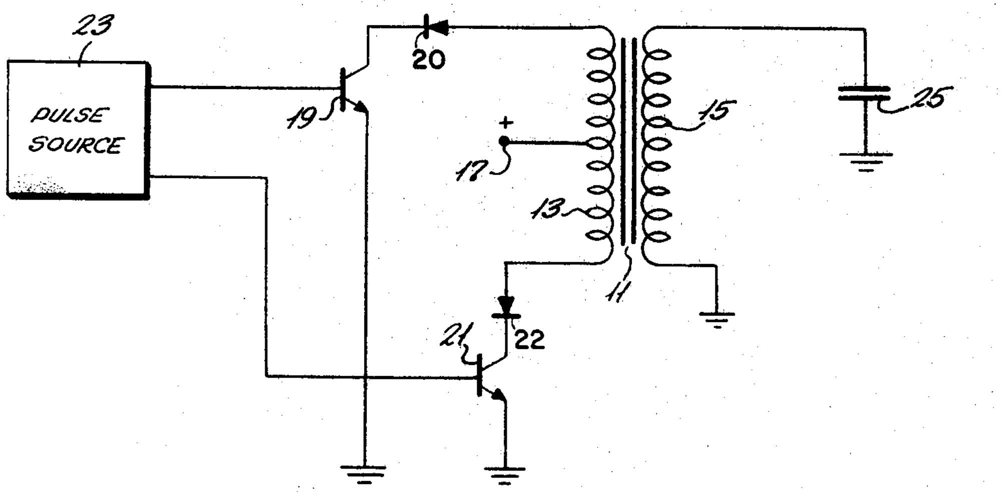
FIGURE 1 is a circuit diagram illustrating one embodiment of a stepped-wave generator which exploits teachings of the present invention.

As shown in FIGURE 1, a stepped-wave generator embodying the present invention may comprise a transformer-type inductive unit 11 having a center-tapped primary winding 13 and a secondary winding 15 preferably having a greater number of turns than each half of the primary winding. Center tap 17 of the primary winding 13 is connected to the positive potential supply terminal of a conventional form of low-impedance source (not illustrated). The upper half of primary winding 13 is connected to the collector of an NPN transistor 19 through diode 20 and the lower half of the same primary winding is connected to the collector of an NPN transistor 21 through diode 22, the emitters of these transistors being grounded. A pulse source 23 applies triggering impulses in alternation to the bases of the transistors 19 and 21, thereby causing these two transistors to conduct current briefly through the associated halves of the primary in synchronism with the triggering impulses. It should be recognized that these currents are alternately of such directions through winding halves wound in such directions that the resulting output voltages which they induce in secondary 15 tend to be of opposite polarities. Diodes 20 and 21 protect their associated transistor collectors from negative voltage excursions. One end of the second winding 15 is shown connected to ground, while the other end thereof is connected to a grounded fixed capacitance 25, such that the paralleled capacitance and inductance may exhibit neutral resonant frequencies characterized by the inductances exhibited at various times.

Figure 2:
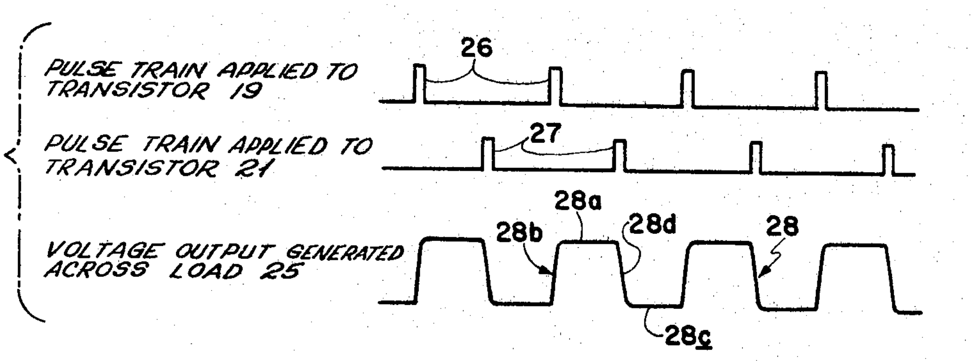
FIGURE 2 illustrates waveforms of electrical signals associated with the circuit of FIGURE 1.

In FIGURE 2, the pulses 26 and 27 applied by the pulse source 23 to the bases of the transistors 19 and 21, respectively, occur at regular intervals in the illustrated trains, with the pulses 27 applied to the transistor 21 occurring substantially midway in the intervals between successive pulses 26 applied to the transistor 19. When one of the voltage pulses 26 is applied to the transistor 19, it renders the transistor 19 conductive; whereupon current will flow from the positive voltage source applied to terminal 17, through one side of the primary winding 13, and through the transistor 19 to ground, for the duration of that pulse only. When one of the voltage pulses 27 is applied to the transistor 21, current will flow from the positive source applied at terminal 17, through the other side of the primary winding 17, and through the transistor 21 to ground, for the duration of that pulse only. Absenting any such triggering or synchronizing pulses, both transistors remain cut off and the primary winding 13 will be open-circuited. The transistors thus act as electronic control switches, alternately grounding opposite sides of the primary winding 13 for short intervals of time and thereby causing the desired primary current bursts to flow in synchronism with the control impulses 26 and 27.

When transistor 19 is rendered conductive by one of pulses 26, the resulting current flow in the upper half of primary winding 13 quickly drives output voltage 28 across the capacitive load 25 to a high value **28*a* during the rise 28*b*. As soon as the voltage across the capacitor 25 has reached the desired high voltage level, the control pulse 26 will have ended. While transistor 19 is conducting, the inductance as witnessed by the transformer secondary 15 will be only relatively low leakage inductance of the transformer 11. Accordingly, the voltage across the capacitor 25 is being driven to its positive level from a source having a relatively low inductance, and the LC combination then has a high natural resonance frequency. This fact permits the desired potential level to be reached rapidly, and in a substantially sinusoidal manner during the rise 28*b*. When neither of the control transistors 19 and 21 is conducting, and the primary winding of the transformer 11 is thus effectively open-circuited, the inductance of the transformer as witnessed by the secondary will be a relatively high inductance. Therefore, when the secondary voltage rises to the desired level and the pulse applied to the transistor 19 terminates, the inductance in parallel with the capacitor will be high and the same LC combination then has a relatively low natural resonance frequency. This condition prevents the voltage across the capacitor 25 from decaying rapidly, and thus the substantially flat top 28*a*** of the square wave illustrated in FIGURE 2 is achieved.

When transistor 21 is rendered conductive by one of pulses 27, the resulting current flowing through the lower half of primary winding 13 will tend to drive the output voltage across the capacitor in the negative direction. The voltage across capacitor 25 reaches a desired lowered potential level **28*c* by the time the pulse 27 terminates. Because the transistor 21 is conducting in association with a low-impedance source during the time that the secondary output voltage is being driven in the negative direction, the inductance of the transformer 11 as witnessed by the capacitor 25 will be only the relatively low leakage inductance of the transformer, and, accordingly, a short fall time in the switching from the high potential level 28*a* to the low potential level 28*c* will be achieved in a substantially sinusoidal manner at the trailing edge 28*d*. Primary winding 13 is again essentially open-circuited upon termination of pulse 27, and the inductance of the transformer 11 witnessed by the capacitor 25** will again become a high inductance, such that the resulting LC combination of low natural frequency prevents a rapid decay of the voltage across that capacitor.

Thus a good stepped wave, such as the illustrated square wave 28 having sharp leading and trailing edges and having substantially flat portions therebetween is conveniently and simply achieved in accurate synchronism with control pulses. As has already been noted, a unique mode of operation results because the inductance of the transformer as seen by the capacitor is low during the rise and fall times of the stepped wave and is high during the substantially flat portions thereof. Moreover the exciting currents promote this unusual operation with low dissipation of power because the circuit exhibits low inductance during the times that the output is being switched between potential levels, and because the voltage transitions have substantially sinusoidal characteristics. Power is also conserved because the control transistors need only be conductive during brief intermittent intervals. Another significant advantage of the invention is that attendant voltage multiplications can be achieved simultaneously through appropriate design of the relatively simple and inexpensive transformer.

When the stepped-wave generator teachings of the present invention are applied in connection with the modulations of accelerating potentials in a color picture tube, it is desirable that the output potentials be alternated between high positive voltage levels such as 10 and 15 kilovolts. For such purposes, one end of the secondary may be connected to a unidirectional voltage source at an intermediate level such as 12.5 kilovolts. The same stepped-shape (example: square) wave may then be produced across the LC combination on the secondary side, in superimposed relationship (example: alternately adding and subtracting) to the 12.5 kv. DC level. An arrangement of this type is illustrated in FIGURE 3, wherein the elements of functions corresponding to those of the elements in FIGURE 1 are designated by the same reference characters with distinguishing single-prime accents added. Waveform 29 characterizes the fact that the output signals developed across capacitance 25′ and at output terminal 30 are alternately at a relatively high level **29*a* during certain periods (between times $t_1$ and $t_2$, for example) and at a relatively low level 29*b* (between times $t_2$ and $t_3$, for example). The pulses 29*a* and 29*b* are respectively positive and negative in relation to a D-C voltage level 29*c* which is substantially that applied to terminal 31 from a high voltage source, and upon which the pulses are effectively superimposed. These pulses are developed with the aid of the secondary 15′ of the transformer-type inductance unit 11′ having a center-tapped primary 13′. A positive D-C supply connection 17′ provides pulse excitations of the transformer primary halves at times controlled by the associated transistors 19′ and 21′. The base of transistor 19′ receives short control pulses (32 and 34**)

in alternation with short control pulses (33 and 35) applied to transistor 21', from an appropriate source or sources (example: multivibrator pulse-generating equipment). Primary current pulses, synchronized with the triggering of transistor 19' into a conductive state by control pulses such as 32 and 34, flow in direction of arrow 36, inducing the higher-level outputs 29*a* which are sustained by capacitance 25' until the transistor 21' is at alternate times triggered into conduction by control pulses such as 33 and 35 which cause current pulses to flow through the lower half of primary 13' in the opposite direction of arrow 37. The voltage excursions on the secondary side are governed mainly by the turns ratio multiplied by the primary voltage, although the secondary voltage obtained from a given D-C supply is greater than expected due to the Q of the circuitry. Hence, the D-C voltage at supply terminal 17' may be lower than that for a normal type of push-pull operation, and the resonance phenomena present in the system is thus employed to a further advantage in that it reduces the input power requirements. In a system wherein the output terminal 30 represents an accelerating-anode connection for a velocity-modulation type television picture tube, and 25' its capacitance to ground, the D-C voltage level 29*c* at secondary terminal 31 may be about 15 kv., with the positive pulses 29*a* extending upwardly 4 kv. to 19 kv., and with the negative pulses 29*b* extending downwardly 2 kv. to 13 kv. In addition to the aforesaid high-voltage outputs, related output pulses 38 of correspondingly-synchronized periodicities but reversed polarities, are conveniently taken from the output terminal 39 of a portion 15*a* of the secondary winding 15'.

In FIGURE 4, a further modification is illustrated, the elements which are functionally like those of the preceding figures being characterized by the same reference numerals with distinguishing subscripts and double-prime accents being added. On the primary side of transformer-type inductance unit 11'', the upper and lower windings 13*a* and 13*b* are separate and wound in different directions, such that current flows in the same direction from positive source terminals 17*a* and 17*b*, respectively, will nevertheless induce secondary voltage of opposite polarities. On the secondary side, relatively low voltage pulse outputs of the same polarizations as those appearing at terminals 30'' are obtainable from tap 39'' and, significantly, the transformer insulations need not be capable of withstanding the maximum output potentials (example: 19 kv.) representing positive output pulses superimposed upon the high voltage D-C supply. In the latter connection, the high voltage supply terminal 31'' is coupled to the output terminal, through a choke 40, but is isolated from secondary winding 15'' by a blocking capacitor 41. The transformer insulation thus need only insulate for the peak values of the output pulses developed across the secondary 15'', and may therefore be of less bulky and costly construction than would otherwise be permissible. In another alternative construction, not illustrated, the secondary side of the inductance unit may comprise two or more winding portions each separately tuned with a capacitance, to exhibit separate outputs each developed in accordance with unique principles as discussed herein.

Pulses 32*a* and 34*a* in FIGURE 5 characterize the very brief current-flow conditions in the upper half of transformer primary 13' (FIGURE 3) when the transistor 19' is periodically biased into conduction by the voltage pulses 32 and 34, respectively, at times $t_1$, $t_3$, etc. Current pulses 33*a* and 35*a* occur through the lower half of transformer primary 13' when the opposite transistor 21', is periodically biased into conduction substantially at times $t_2$, $t_4$, etc., by the aforementioned control effects of pulses 33 and 35. Attendant high-voltage swings induced in the secondary 15' are of substantially sinusoidal form, as shown by the leading and trailing edges 29*d* and 29*e* of the resulting high-voltage pulse train 29. As has been noted hereinabove, the capacitance 15' on the secondary side, and the inductance with which it is combined, tend to have a relatively high natural resonant frequency during the crossover conditions under discussion (i.e., at the times the leading and trailing edges are developing). During such crossover periods, the transformer exhibits on its secondary side essentially only a relatively small leakage inductance value. Dashed linework 29*f* characterizes the damped sinusoidal output which would ordinarily be expected to result. However, upon open-circuiting of the primary following each shock-exciting burst or pulse of current therethrough, the inductance effective on the secondary side is significantly increased, causing the effective resonant frequency to be much lower until the next-succeeding primary current pulse occurs. Specifically, the latter inductance is by design made high enough such that significantly less than one-half cycle of voltage variation can occur either in the interval between such times as $t_{1b}$–$t_2$ and $t_{2b}$–$t_3$ (FIGURE 5). Some voltage variation (decay, in the case of pulses 29*a*, and rise, in the case of pulses 29*b*) can be expected to occur, as illustrated in FIGURE 5. The secondary voltage waveform can be improved by having the control transistors cut off somewhat before the primary-current pulses (32*a*–35*a*) reach zero level under the then-existing resonant-circuit conditions. By way of example, the triggering pulses 32–35 may each be made shorter than the natural half-cycle period $t_1$–$t_{1b}$ of primary current pulses such as pulse 32*a*, such that it cuts off transistor 19' at time $t_{1a}$; the secondary voltage of wavefront 29*d* thus does not reach its peak when cut-off occurs, and, instead, will continue its upward rise so that the output voltage crest occurs after time $t_{1b}$ and while the resonant frequency is lowered. The altered positive pulse can then be caused to remain at a desirable high level throughout the period $t_{1a}$–$t_2$. Similarly, early cut-off of transistor 21' at time $t_{2a}$, rather than at time $t_{2b}$, can then cause the negative pulse to be sustained more nearly at a substantially fixed level between times $t_{2b}$ and $t_3$.

There are numerous departures which may be made from the specific practices and constructions described thus far. By way of example, those skilled in the art will appreciate that desired symmetrical or non-symmetrical stepped waveforms may be developed by suitably adjusting the phasing of one train of control pulses (such as pulses 32, 34, etc.) relative to the other (such as pulses 33, 35, etc.). These control pulses may originate with a common pulse generator, or with separate synchronized pulse sources, or otherwise. Although positive control pulses have been illustrated, the system may instead be triggered into the intended operations by other pulses, such as alternate positive and negative pulses each of which is responsible for stepping the output in a different direction. A single primary winding may be used when the current pulses through it are alternately in different directions. Autotransformer units may replace the more conventional transformer inductance units of the illustrated embodiments, and tubes, SCR's and the like may replace the transistors shown in control of the current pulsing. Accordingly, it should be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. Pulse-forming apparatus for driving a capacitive load comprising inductive means having an inductance portion and said capacitive load connected in a resonant-circuit combination, said inductive means including inductance-changing means coupled with said inductance portion and capable of being switched between first and second states in which it causes said inductance portion to exhibit high and low values of inductance respectively, means coupled to said inductance-changing means for switching said inductance-changing means between said different states and for transferring electrical energy to the resonant-circuit combination of said inductance portion and said capacitive load in synchronism with the switching between said different states in a manner so that the electrical energy transfer takes place when said inductance portion exhibits said low value of inductance.

2. Pulse-forming apparatus as set forth in claim 1 wherein said inductive means comprises first and second winding disposed in inductively-coupled relationship with one another, said first winding comprising said inductive portion and said second winding comprising said inductance-changing means, and wherein said means for switching comprises electronic valving means alternately first short-circuiting at least a portion of said second winding through a low impedance and then open-circuiting at least said portion of said second winding.

3. Pulse-forming apparatus as set forth in claim 2 wherein said low impedance comprises an electrical power source transferring said electrical energy synchronously with said short-circuiting.

4. Pulse forming apparatus comprising inductive means having an inductance portion and a capacitance connected in a resonant-circuit combination, driving means coupled to said resonant-circuit combination for intermittently transferring energy to said resonant-circuit combination by applying pulses to said combination and simultaneously with the transfer of energy to said combination increasing the natural resonance frequency of said combination, and control means coupled to said driving means for exciting said driving means to apply said pulses to said combination in a predetermined time relationship wherein the durations of said pulses are short in relation to the spacings therebetween.

5. Pulse-forming apparatus as set forth in claim 4 wherein said driving means increases the resonant frequency of said combination by decreasing the effective inductance of said inductance portion.

6. Pulse-forming apparatus as set forth in claim 5 wherein said inductive means has a second inductance portion inductively coupled with said first mentioned inductance portion, and wherein said driving means excites said second inductance portion of said inductive means to increase the resonant frequency of said combination and to supply electrical energy thereto.

7. Pulse-forming apparatus as set forth in claim 6 wherein said driving means shock-excites said second inductance portion of said inductive means alternately with pulses of electrical energy which induce voltages of opposite polarities in said first mentioned inductance portion of said inductive means.

8. Pulse-forming apparatus as set forth in claim 6 wherein said inductive means comprises a transformer, said first and second inductance portions thereof comprising output and exciting winding portions, respectively, inductively coupled with one another.

9. Pulse-forming apparatus as set forth in claim 8 wherein said driving means comprises current supply means, and electronic valving means selectably excitable to pass pulses of current from said supply means through said exciting winding portion of said transformer, and wherein said control means comprises means electrically biasing said valving means to conduct said current pulses in a predetermined alternation wherein alternate ones of said pulses induce voltages of opposite polarities in said output winding portion and wherein the durations of said current pulses are short in relation to the spacings therebetween.

10. Pulse-forming apparatus as set forth in claim 9 wherein said supply means comprises a low-impedance source of unidirectional voltage, wherein said electronic valving means comprises a pair of semiconductor current-controlling devices each adapted to conduct current flow therethrough separately responsive to electrical biasing thereof into a conductive state, and means connecting each of said devices in a different circuit relationship with said exciting winding portion of said transformer and with said source to control the flow of different ones of said pulses of current through said exciting winding portion.

11. Pulse-forming apparatus as set forth in claim 8 further comprising a source of unidirectional voltage, and means superimposing voltages from across said output winding portion upon the unidirectional voltage from said source.

12. Pulse-forming apparatus as set forth in claim 7 wherein said pulses of electrical energy are of duration not in excess of about one-half the period of signals of the high natural resonant frequency of said combination which exists during the periods of said pulses, and wherein the spacings between said pulses are of duration less than one-half the period of signals of the low natural resonant frequency of said combination which exists during the periods between said pulses.

13. Pulse-forming apparatus comprising a transformer including primary winding and a secondary winding, a capacitance connected across at least a part of said second winding, and means coupled to said primary winding for applying to said primary winding current pulses separated by intervals during which said primary winding is open-circuited, alternate ones of said pulses having polarities which drive output voltage from said secondary winding in opposite directions.

14. Pulse-forming apparatus comprising a transformer including a tapped primary winding and a secondary winding, a capacitance connected across at least a part of said secondary winding, and means coupled to said primary winding for alternately applying to opposite sides of said primary winding current pulses separated by intervals during which said primary winding is open-circuited, said pulses applied to opposite sides of said primary winding having polarities which drive output voltage of said secondary winding in opposite directions.

15. Pulse-forming apparatus comprising a transformer including an output winding and at least one input winding, a capacitance connected across at least a part of said output winding, and means coupled to said transformer for applying to said transformer current pulses having polarities which drive output voltage from said output winding alternately in opposite directions, said current pulses being separated by intervals during which all the windings of said transformer except said output winding are open-circuited.

16. Apparatus for forming stepped electrical waves comprising a transformer including a tapped primary winding and a secondary winding, a source of potential, a first circuit connecting said source of potential between the tap of said primary winding and one end of said primary winding, a second circuit connecting said source of potential between the tap of said primary winding and the other end of said primary winding, a first switch in said first circuit, a second switch in said second circuit, means coupled to said first and second switches to render said first and second switches alternately closed for short intervals separated by intervals in which both said first and second switches are open, and a capacitance connected in resonant-circuit relationship with at least a portion of said secondary winding.

17. Apparatus as recited in claim 16 wherein said first and second switches are electronic valves having control electrodes controlling the conductivity thereof, and wherein said means to render said switches closed comprise means to apply pulses alternately to the control electrodes of said electronic valves.

18. Apparatus as recited in claim 17 wherein said capacitance is connected across at least a portion of said secondary winding in parallel-circuit relationship therewith.

19. Apparatus for forming stepped waves comprising a transformer, a first circuit connected to said transformer and operable when closed to apply a current pulse to said transformer to drive the output voltage from said transformer in one direction, a second circuit connected to said transformer and operable when closed to apply a current pulse to said transformer to drive the output voltage from said transformer in the opposite direction, means coupled to said first and second circuits to render said first and second circuits alternately closed for short intervals separated by intervals in which both said first and second circuits are open, and a capacitance connected in resonant-circuit relationship with at least a portion of an output circuit of said transformer.

20. A pulse forming apparatus comprising inductive means in resonant circuit combination with capacitance, driving means for intermittently applying pulses to said resonant circuit combination and simultaneously with said pulses increasing the natural resonant frequency of said resonant circuit combination, and control means exciting said driving means to apply said pulses in a time relationship in which the duration of said pulses are not in excess of about one-half the period of signals of the high natural reasonant frequency of said resonant circuit combination which exists while said pulses are applied to said resonant circuit combination, and wherein the spacings between said pulses are of a duration less than one-half the period of signals of the low natural resonant frequency of said combination which exists during the intervals between said pulses.

21. Pulse forming apparatus comprising a transformer including a primary winding and a secondary winding, a capacitance connected across at least a part of said secondary winding and means coupled to said primary winding for applying to said primary winding means current pulses separated by intervals during which said primary winding is open circuited.

22. A method of rapidly stepping the voltage across a highly capacitive load comprising the steps of connecting an inductance to said load to form a resonant circuit with the capacitive thereof, intermittently lowering the inductive impedance of said inductance to a relatively low value for short intervals, returning said inductive impedance to a relatively high value during the periods between said short intervals, and transferring energy into said resonant circuit during said short intervals to cause the potential across said capacitance to change to a different level during said intervals.

23. A method as recited in claim 22 wherein said short intervals are of a duration not in excess of about one-half the period of signals of the resonant frequency of said resonant circuit when said inductive impedance is at said low value.

24. A method as recited in claim 23 wherein said periods between said short intervals are of a duration less than one-half the period of signals of the resonant frequency of said resonant circuit when said inductive impedance is at said high value.

25. A method as recited in claim 22 wherein pulses are applied to said inductance during said short interval with polarities to drive the voltage across said load in alternate directions between levels, at least some of said pulses transferring energy to said resonant circuit.

26. A method of rapidly stepping the voltage across a highly capacitive load between levels comprising the steps of connecting an inductance in a resonant circuit with said load, applying pulses to said resonant circuit, switching the inductance in said resonant circuit to a relatively low value while said pulses are applied to said circuit, returning said inductance to a relatively high value during the periods between said pulses, the duration of said pulses being selected so that they are not in excess of about one-half the period of signals of the high natural resonant frequency of said resonant circuit which exists while said pulses are applied to said resonant circuit, the spacings between said pulses being selected to have durations less than one-half the period of signals of the low natural resonant frequency of said resonant circuit which exists during the intervals between said pulses.

References Cited

UNITED STATES PATENTS

| | | | |
|---|---|---|---|
| 2,964,676 | 12/1960 | Davies et al. | 307—314 XR |
| 3,221,187 | 11/1965 | McCarthy | 307—282 XR |
| 3,239,763 | 3/1966 | Cistola | 328—223 XR |

OTHER REFERENCES

Ohrt, German application 1,086,746, printed Aug. 11, 1960.

Hilberg, German application 1,121,115, printed Jan. 4, 1962.

JOHN S. HEYMAN, Primary Examiner

S. T. KRAWCZEWICZ, Assistant Examiner

U.S. Cl. X.R.

307—265, 314; 328—65, 223; 331—165